Figure 1:
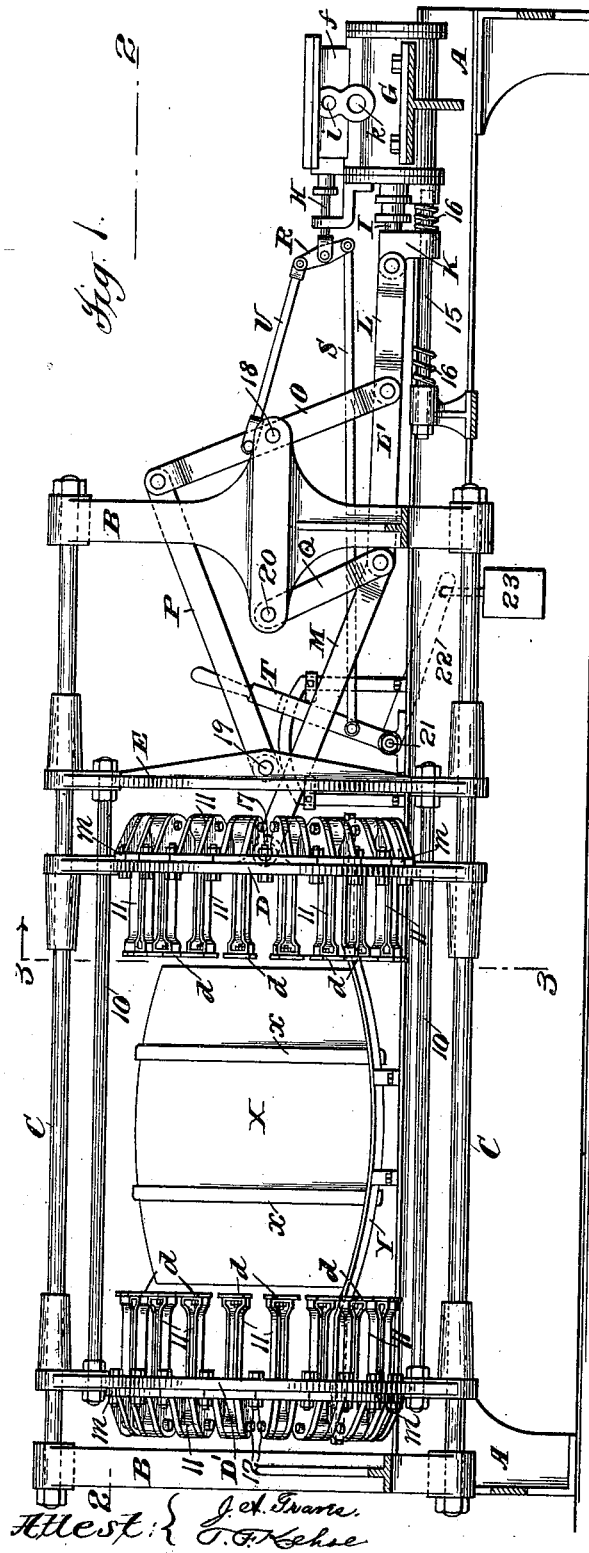

No. 665,461. Patented Jan. 8, 1901.
H. U. PALMER & C. LANGLOTZ.
BARREL HOOPING MACHINE.
(Application filed Feb. 11, 1899.)

(No Model.) 3 Sheets—Sheet 1.

No. 665,461. Patented Jan. 8, 1901.
H. U. PALMER & C. LANGLOTZ.
BARREL HOOPING MACHINE.
(Application filed Feb. 11, 1899.)
(No Model.) 3 Sheets—Sheet 2.
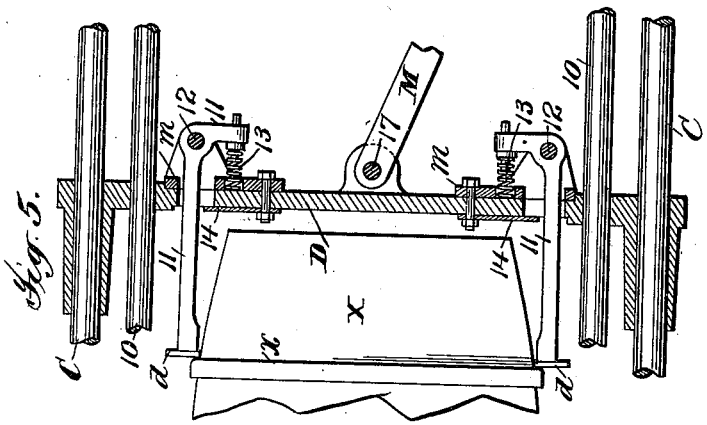
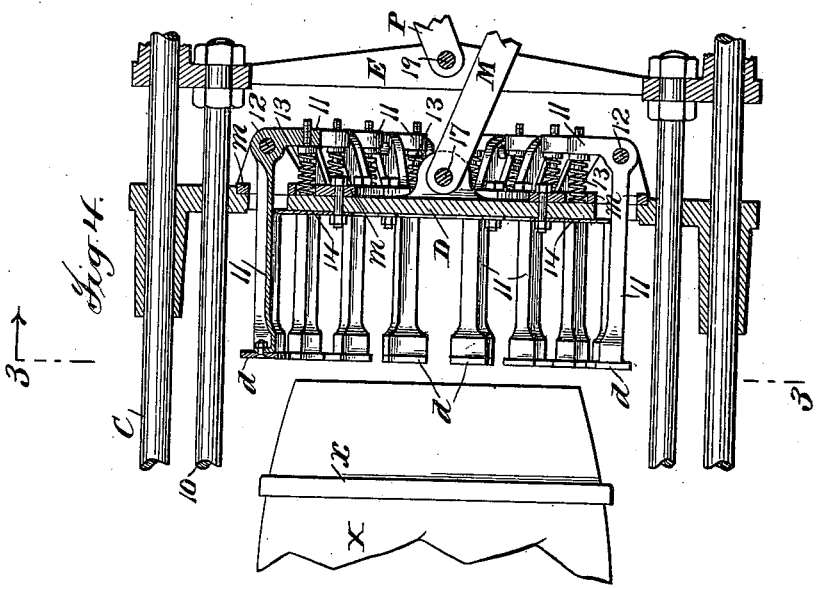
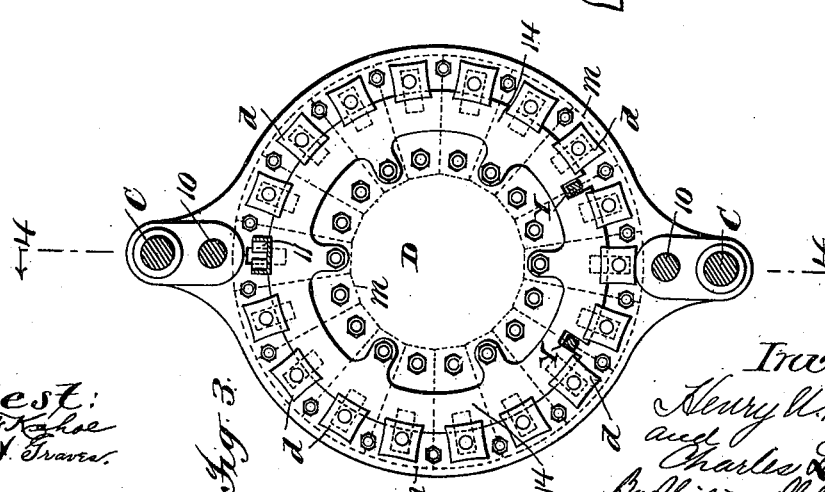

No. 665,461. Patented Jan. 8, 1901.
H. U. PALMER & C. LANGLOTZ.
BARREL HOOPING MACHINE.
(Application filed Feb. 11, 1899.)
(No Model.) 3 Sheets—Sheet 3.
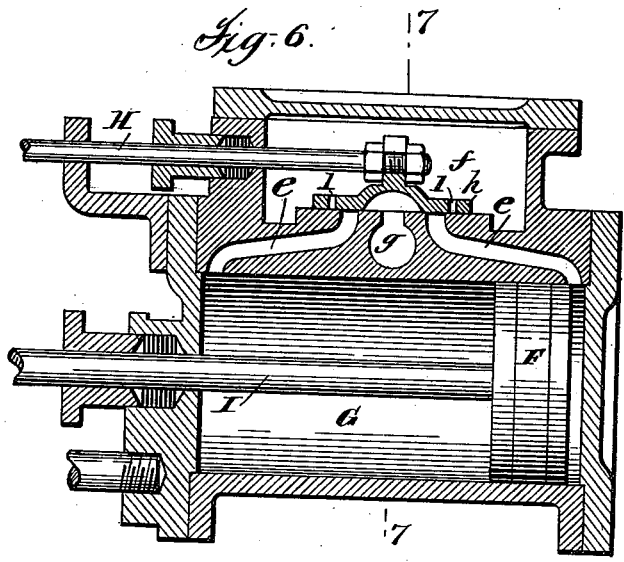
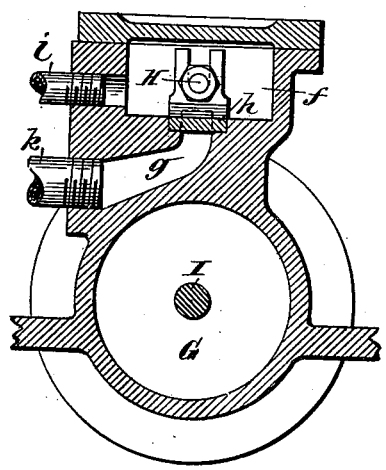
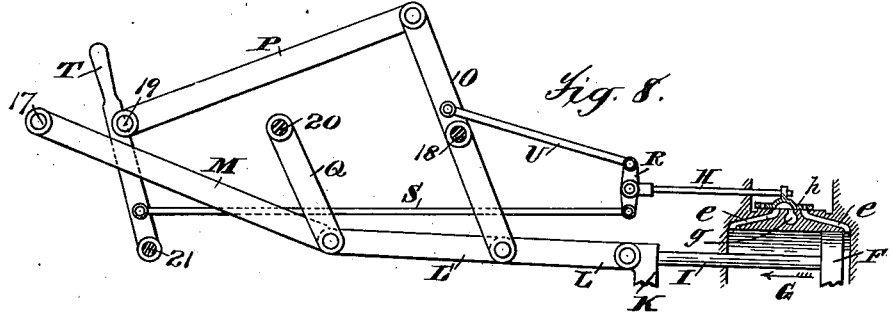
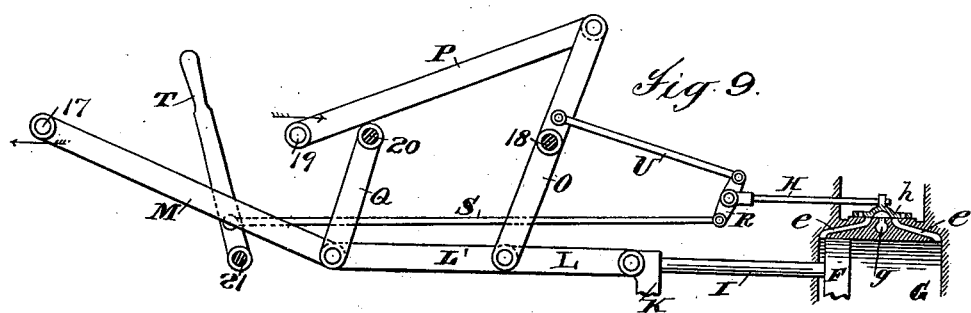
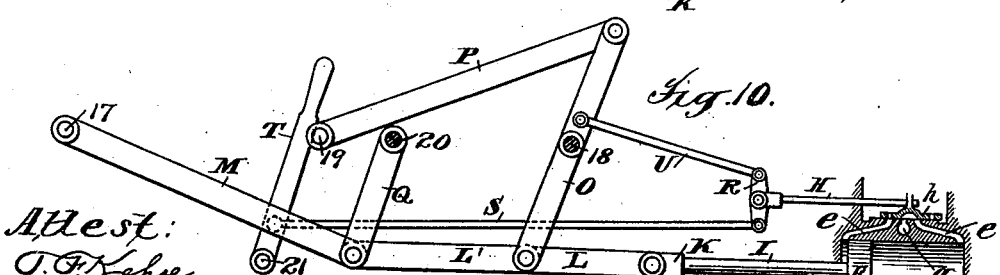

UNITED STATES PATENT OFFICE.

HENRY U. PALMER AND CHARLES LANGLOTZ, OF NEW YORK, N. Y.; SAID LANGLOTZ ASSIGNOR TO LOWELL M. PALMER, OF SAME PLACE.

BARREL-HOOPING MACHINE.

SPECIFICATION forming part of Letters Patent No. 665,461, dated January 8, 1901.

Application filed February 11, 1899. Serial No. 705,256. (No model.)

*To all whom it may concern:*

Be it known that we, HENRY U. PALMER and CHARLES LANGLOTZ, citizens of the United States, residing at New York city, in the county of Kings and State of New York, have invented certain new and useful Improvements in Barrel-Hooping Machines, fully described and represented in the following specification and the accompanying drawings, forming a part of the same.

The object of the present invention is to provide an improved machine for driving hoops onto the opposite ends of barrels, and we aim especially to provide a machine by which barrels varying in form or size may be hooped rapidly and efficiently with wooden hoops without danger of breaking the hoops and, further, to provide a machine by which such barrels may be thus hooped with either wooden or wire hoops without change of the machine or interference with its rapid and efficient operation.

The invention has been made in connection with a machine such as shown in United States Letters Patent No. 573,159, dated December 15, 1896, and it includes certain improvements in machines of that class employing two oppositely-moving hoop-driving heads with hoop-driving arms automatically radially adjustable, by which improvements elastic-fluid pressure is properly applied to drive the heads with a yielding or cushioned stroke and means are provided for conveniently controlling the application of the elastic fluid, so that the length of the hoop-driving stroke and the pressure on the hoop-driving arms may be readily varied by the operator to secure just the driving action required for the barrel being hooped. We are thus enabled to hoop common barrels very rapidly and efficiently and to use wooden hoops without the breakage of the hoops that is liable to occur in applying other machines to driving wooden hoops.

The invention includes also certain improvements in hoop-driving heads especially adapted for use in driving wire hoops and by which a machine embodying the other features of the invention is most efficiently equipped for acting on wooden or wire hoops indiscriminately.

The invention includes also certain improvements in driving and control mechanism for hoop-driving machines which may be used in machines not employing hoop-driving arms which are automatically radially adjustable—as, for instance, machines for driving the head-hoops only.

For a full understanding of the invention a detailed description of a machine embodying all the features of the same in their preferred form will now be given in connection with the accompanying drawings, forming a part of this specification, and the features forming the invention will then be specifically pointed out in the claims.

Figure 2:
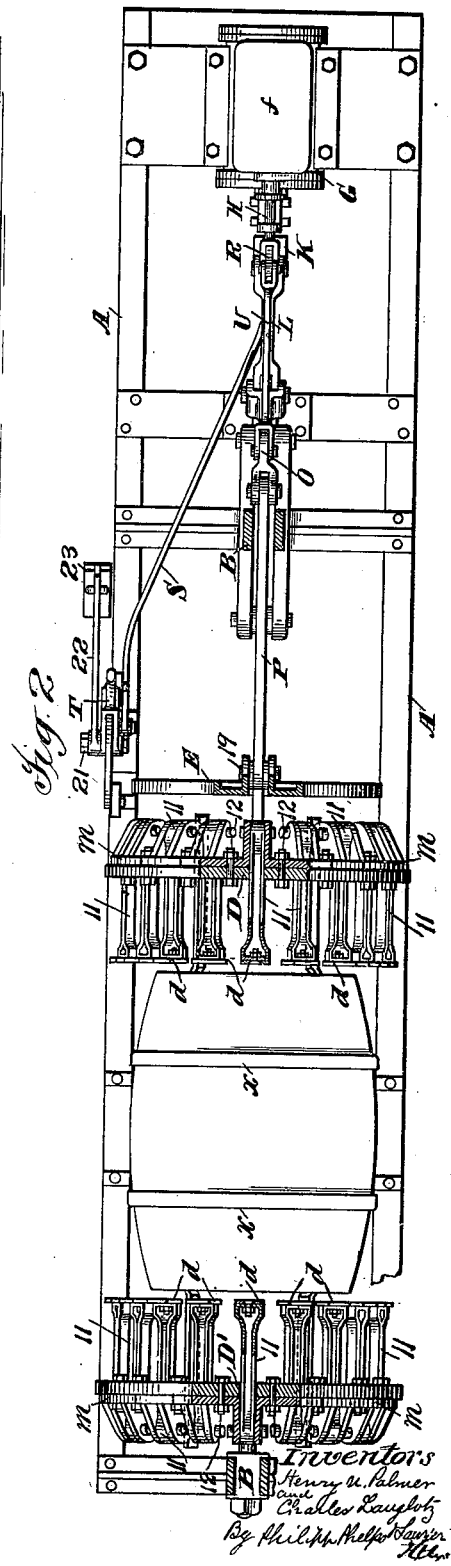

In the drawings, Figure 1 is a side elevation of the machine with the frame sectioned to show the parts. Fig. 2 is a sectional plan of the same on the line 2 of Fig. 1. Fig. 3 is a cross-section on the line 3 of Figs. 1 and 4. Fig. 4 is a section of one driving-head on the line 4 of Fig. 3, showing the hoop-driving arms withdrawn from the barrel, as in Fig. 1. Fig. 5 is a view similar to Fig. 4, showing the parts in position with the hoop fully driven by the hoop-driving arms. Fig. 6 is a detail section of the motor-cylinder on an enlarged scale, showing the parts in the same position as in Fig. 1. Fig. 7 is a cross-section on the line 7 of Fig. 6. Figs. 8, 9, and 10 are diagrammatic views showing the driving and control mechanism in different positions.

Referring now to the drawings, upon the base-frame A are mounted vertical standards B, in which are secured strong bars C at top and bottom, on which slide the oppositely-moving hoop-driving heads D D'. A single driving-cylinder is used, which is placed at one end of the machine and by which the driving-head D is actuated by a direct connection, and the driving-head D' at the opposite end of the machine is actuated through a ring E, moving on the bars C and connected to the driving-head D' by rods 10, the movement of the ring E and head D' being reversed relatively to the driving-head D, as described hereinafter.

The driving-heads D D' are duplicates so far as the barrel-hooping devices are concerned, and each carries a series of driving-arms *d*, arranged in a circle and curved to conform to the circumference of the barrel. The driving-arms $d$ are shown as carried by bell-crank levers 11, pivoted at 12 in brackets on rings $m$, mounted on the outer sides of the driving-heads, and the shorter arms of these bell-crank levers 11 are acted upon by springs 13, so as to press the driving-arms $d$ inward toward the barrel, this inward movement being limited by stop-rings 14 on the inner sides of the driving-heads. The driving-arms $d$ thus follow the contour of the barrel as the heads are forced inward in driving the hoop and are automatically radially adjustable against the pressure of the springs 13 and returned to position thereby, thus securing the action of the hoop-driving arms $d$ upon the full thickness of the hoop during the driving. These hoop-driving arms $d$ also move independently of each other, so that they will conform to and follow the barrel, although the latter is irregular in form, as usual. The hoop-driving arms $d$ are preferably of such lateral extent and number as to form approximately a continuous driving-ring, as shown, so that an even pressure on all parts of the hoop is secured. This is important in driving either wooden or wire hoops, as it secures a substantially even distribution of driving pressure throughout the hoops and avoids the danger of breaking wooden hoops or of breaking or bending wire hoops. If only the ordinary wooden hoops are to be driven, arms of such lateral extent and number as shown in Letters Patent No. 573,159 will be found satisfactory; but for driving wire hoops on common barrels it is important that the arms be quite narrow, so as to follow closely the irregular contour of the barrel, as on account of the small diameter of the wire used and its flexibility and consequent close conformation to the contour of the barrel there is danger of wide arms slipping off the hoops on account of one portion of the arm riding upon a raised portion of the barrel sufficiently to throw another part of the arm outside the part of the hoop on which it acts. By the use of these driving-arms of small width, but of such number as to form an approximately complete ring, either wooden or wire hoops may be driven efficiently, and this feature, while not essential to the broader features, is included among the more specific features of our invention as defined by the claims. In the machine shown eighteen narrow driving-arms are used; but it will be understood that the number and width of the arms may be varied.

Referring now to the driving mechanism, both driving-heads D D' are driven by the piston F of a motor-cylinder G, in which, preferably, compressed air is employed, although it will be understood that any other suitable elastic motor fluid may be used. This cylinder is provided with single induction and exhaust ports $e$ at opposite ends, communicating with the interior of steam-chest $f$ and induction-pipe $i$, and with the exhaust-cove $g$ and exhaust-pipe $k$ under the control of the slide-valve $h$, actuated by valve-rod H. The compressed air or other elastic motor fluid passes from the valve-chest $f$ to the ports $e$ through the small ports 1, formed in the valve, which are preferably used as a convenient means of securing the gradual admission desired.

The piston F is connected through piston-rod I to a head K, mounted to move on a stationary horizontal bar 15, which is preferably provided with coiled spring 16 at opposite ends, forming spring-buffers for the head K, and this head K is connected by links L L' M to the driving-head D, the link M being pivotally connected to the head D at 17, so that the latter moves in the same direction as the piston F, and the head K is connected to ring E through link L, lever O, pivoted to the bracket B at 18, and link P, pivoted to the ring E at 19, so that the ring E and driving-head D' move in the opposite direction to the piston. The links L L' are pivotally connected at the junction of lever O, and Q is a suspending-link connected to the links L' M at their point of juncture and hung on the bracket B at 20. The piston F thus actuates both driving-heads, so as to move them under the yielding pressure of the compressed air or other elastic fluid in the cylinder G, the heads, however, being moved in opposite directions simultaneously.

The means for controlling the valve $h$ are as follows: The valve-rod H is pivotally connected to the middle of a short vertical lever R, and the end of this lever below the valve-rod H is connected by link S to an operating-lever T, pivoted at 21 to the frame A and shown as provided with an arm 22, weighted by weight 23 for returning the operating-lever T to position when released by the operator. The operating-lever is shown as of suitable form for operation by hand; but it will be understood that a treadle or any suitable operating device may be used. The upper end of the lever R is connected by link U to the lever O above its pivot 18.

The operation of the machine is as follows: As shown in Figs. 1 to 7, the parts are in position for hooping a barrel X, which has been placed on the barrel-support Y, between the driving-heads D D', with a hoop $x$ on each end in position to be driven. The driving-heads are now fully withdrawn and the operating-lever in its normal position, with the valve $h$ of cylinder G closed and the piston F at the outer end of the cylinder G, the hoops being driven on the movement of the piston to the left, as shown in the drawings. The operating-lever T is now thrown to the left for opening the valve, and this movement of the lever T through link S rocks the lever R on its pivot to link U, and thus moves the valve-rod H and valve $h$ to the left from the position of Figs. 1 and 6 and into the position shown in Fig. 8, in which the motor fluid is admitted from valve-chest $f$, through ports 1 $e$, into the outer end of the cylinder G, behind the piston F, and the other port *e* is connected to the exhaust-cove *g*. The piston now moves to the left in the cylinder G and through the link-and-lever connections, previously described, moves the driving-heads D D', with their driving-arms *d*, in opposite directions and from the position shown in Figs. 1 and 4 to the position shown in connection with driving-head D in Fig. 5, the position of driving-head D' at the opposite end of the barrel being the same as that of driving-head D in Fig. 5, and thus the two hoops *x* are driven simultaneously into proper position on the barrel, the driving-arms *d* following the contour of the barrel by swinging outward against the pressure of springs 13 as the hoops are driven. By this hoop-driving movement of the lever O as thus actuated by the piston F, acting, through link U, upon lever R, the lever R is rocked on its pivot to the link S, so as to move the valve-rod H and valve *h* to the right in the drawings, and thus close both ports *e*. All the parts are thus brought into the position shown in Fig. 9, or into a position corresponding to a lesser movement of the piston F, which depends upon the extent to which the operating-lever T is moved. As both ports *e* are closed, the piston F will therefore be held stationary and all the parts will remain in the position shown in Fig. 9 until the operating-lever T is again moved either to the right or left. Assuming that the lever T has been moved less than its full throw, so that the full stroke of the piston F has not been made, the operating-lever T may now be thrown farther to the left, so as to again connect the ports 1 *e* at the outer end of the cylinder, and the same operation will be repeated with a stroke depending upon the amount to which the lever is moved. If desired, the lever T may be moved to the right to withdraw the heads from the hoops before any of the short strokes, if desired, so as to give a blow upon the hoops. Strokes may thus be repeated as long as the lever and piston have not reached the limit of their movement, so that the hoops may thus be forced nearly home by a long stroke of the piston and then one or more short strokes or blows be given to force the hoops into final position. The hoops *x* having been thus driven fully, either by a single long stroke of the piston F or with an additional short stroke or strokes, the operating-lever T is returned to the right from the position shown in Fig. 9 or other position into which it has been thrown by movement to the left, and this movement of the operating-lever T through the link S rocks the lever R on its pivot to the link U from the position shown in Fig. 9 to that shown in Fig. 10, so as to move the valve *h* to the right and into the position shown in Fig. 10, which opens the left port *e* of cylinder G to the valve-chamber *f* through port *l* and connects the right port of cylinder G to the exhaust-cove *g*, thus admitting air at the left end of the cylinder G behind the piston F, which then moves to the right, returning the driving-heads and operating mechanism to the position shown in Fig. 1, in which the driving-heads D D' are withdrawn from the barrel and the piston F in position for another stroke to the left for hooping the next barrel, during which movement the lever O through link U, lever R, and valve-rod H returns the valve *h* to the position shown in Fig. 6, in which both ports *e* are closed and the valve *h* is ready to be shifted for admitting air to the outer end of the cylinder G and exhausting from the other end of the cylinder when the operating-lever T is again moved to the left.

The machine above described forms a very efficient barrel-hooping machine by which barrels may be hooped very rapidly and either wooden or wire hoops driven tight on barrels of irregular size and form without danger of breaking the hoops. The yielding stroke of the driving-arms secured by the direct application of the elastic-fluid pressure by which just the motor-pressure desired may be secured by regulating the pressure of the compressed air or other elastic-fluid supply and the efficient and convenient control of the admission of the motor fluid to the cylinder G enables a yielding driving stroke of just the required character and length to be secured. An especially desirable feature is the provision for conveniently forcing the hoops home by a succession of strokes of the piston delivered under the complete and convenient control of the operator. This enables the main driving movement to be made quickly and substantially to the same point for different barrels, while the latter part of the driving movement, in which variation is necessary on account of the irregularity in form and size of the barrels, is readily controlled by the operator by the manual control of the operating-lever T, so as to secure just the extent and character of driving required by the barrel then being hooped. This feature is very important also in providing a machine that will drive efficiently wooden or wire hoops without change of the machine. Wire hoops are driven farther on the barrel and tighter than it is safe to driven wooden hoops; but by the present machine the stroke is readily controlled by the operator according to the barrel and hoops, so that wire and wooden hooped barrels may be handled successively with equal rapidity and efficiency.

The combination of the two features of the automatically and independently radially-adjustable hoop-driving arms, which follow the contour of the barrel, so as to secure the engagement of the arms with the full thickness of the hoop throughout the driving operation, and the cushioning stroke of the driving-heads secured by the application of the elastic motor fluid, as described, produces a very efficient cushioned driving action and constitutes an important improvement in barrel-hooping machines, and this combination in machines employing the two oppositely-moving driving-heads forms in itself a part of the invention and may be used with other means for controlling the motor fluid. The driving mechanism for applying and controlling the elastic motor fluid, so as to cushion the stroke and automatically stop the driving movement of the machine at a point determined by the movement of the operating device under the control of the operator, may be used in connection with a single driving-head of the construction shown or with a driving head or heads of different construction from those shown, being excellently adapted for use in machines for driving the end hoops only and not employing radially-adjustable hoop-driving arms, and modifications may be made in the form and arrangement of the devices employed in this driving and control mechanism without departing from the invention.

What we claim is—

1. The combination with two driving-heads and a series of automatically and independently radially-adjustable hoop-driving arms carried by each driving-head, of means for applying the pressure of an elastic fluid to said driving-heads to actuate said heads simultaneously in opposite directions with a driving stroke cushioned by the elastic fluid, and a barrel-support between the heads on which the barrel is free to be moved longitudinally in either direction by the driving-heads during the hoop-driving operation, substantially as described.

2. The combination with two driving-heads and a series of automatically and independently radially-adjustable hoop-driving arms carried by each driving-head, of elastic-fluid-motor cylinder and piston mechanism, connections between said mechanism and the driving-heads for actuating said heads simultaneously in opposite directions with a driving stroke cushioned by the elastic fluid, an operating device and connections for controlling the supply and exhaust of the motor fluid at the will of the operator to vary the length of driving stroke of the driving-heads, and a barrel-support between the heads on which the barrel is free to be moved longitudinally in either direction by the driving-heads during the hoop-driving operation, substantially as described.

3. The combination with two driving-heads and a series of automatically and independently radially-adjustable hoop-driving arms carried by each driving-head, of elastic-fluid-motor cylinder and piston mechanism, connections between said mechanism and the driving-heads for actuating said heads simultaneously in opposite directions with a driving stroke cushioned by the elastic fluid, valve mechanism for controlling the supply and exhaust of the motor fluid, an operating device and connections for controlling said valve mechanism to actuate the heads at the will of the operator, connections whereby the movement of the heads actuates the valve mechanism to cut off the supply and exhaust of the motor fluid and stop the heads at a point determined by the movement of the operating device, and a barrel-support between the heads on which the barrel is free to be moved longitudinally in either direction by the driving-heads during the hoop-driving operation, substantially as described.

4. The combination with the driving-head of a hoop-driving machine, of an elastic-fluid-motor cylinder and piston, connections between said piston and driving-head for actuating the latter, a valve mechanism for controlling the supply and exhaust of the motor fluid, an operating device and connections for actuating said valve mechanism to move the piston and driving-head at the will of the operator, connections whereby the movement of the piston and head actuates the valve mechanism to stop the piston and head at a point determined by the movement of the operating device, and a barrel-support between the heads on which the barrel is free to be moved longitudinally in either direction by the driving-heads during the hoop-driving operation, substantially as described.

5. The combination with the driving-head of a hoop-driving machine, of a motor piston and cylinder, actuating connections between said piston and driving-head, a valve for controlling the supply and exhaust of the motor fluid, an operating device and connection for shifting said valve to move the piston and head, connections between said valve and a moving part of the machine whereby the valve is returned to position to close the admission and exhaust ports and stop the piston and head when the head has reached a point determined by the movement of the operating device, and a barrel-support between the heads on which the barrel is free to be moved longitudinally in either direction by the driving-heads during the hoop-driving operation, substantially as described.

6. In a hoop-driving machine, the combination with a driving-head, of a motor cylinder and piston, actuating connections between the piston and driving-head, a valve controlling the supply and exhaust of an elastic motor fluid, lever R connected to the valve, an operating device connected to lever R for opening the valve, connections between the piston and lever R arranged to close the valve when the piston has reached a point determined by the movement of the operating device, whereby hoops may be driven by a series of strokes controlled by the operator, and a barrel-support between the heads on which the barrel is free to be moved longitudinally in either direction by the driving-heads during the hoop-driving operation, substantially as described.

7. In a hoop-driving machine, the combination of two driving-heads and a series of automatically and independently radially-adjustable driving-arms carried by each driving-head, a motor cylinder and piston, actuating connections between said piston and the driving-heads arranged to move said heads in opposite directions, a valve controlling the supply and exhaust of an elastic motor fluid, lever R connected to the valve, an operating device connected to lever R for opening the valve, connections between the piston and lever R arranged to close the valve when the piston has reached a point determined by the movement of the operating device, whereby hoops at opposite ends of a barrel may be driven by a series of strokes of the oppositely-moving driving-heads controlled by the operator, and a barrel-support between the heads on which the barrel is free to be moved longitudinally in either direction by the driving-heads during the hoop-driving operation, substantially as described.

8. The combination with two driving-heads and a series of automatically and independently radially-adjustable hoop-driving arms carried by each driving-head, of means for applying the pressure of an elastic fluid to said driving-heads to actuate said heads simultaneously in opposite directions with a driving stroke cushioned by the elastic fluid, and means for supporting the barrel between the heads and permitting the barrel to be moved longitudinally in either direction by the driving-heads during the hoop-driving operation, substantially as described.

9. The combination of two hoop-driving rings each formed of a large number of automatically and independently radially-adjustable hoop-driving arms arranged to form an approximately complete ring substantially as shown and described whereby each ring will conform substantially to the line of the hoop being driven on a barrel having an irregular surface and will engage the hoop substantially throughout its length so that small wire hoops may be driven without bending and without the arms slipping off the hoops, means for applying the pressure of an elastic fluid to said driving-rings to actuate said rings simultaneously in opposite directions with a driving stroke cushioned by the elastic fluid, and means for supporting the barrel between the rings and permitting the barrel to be moved longitudinally in either direction by the driving-rings during the hoop-driving operation, substantially as described.

10. The combination with two driving-heads each of which carries a series of automatically and independently radially-adjustable hoop-driving arms arranged to form an approximately complete driving-ring, each of said arms being of small width, substantially as and for the purpose set forth, of elastic-fluid-motor cylinder and piston mechanism, connections between said mechanism and the driving-heads for actuating said heads simultaneously in opposite directions with a driving stroke cushioned by the elastic fluid, an operating device and connections for controlling the supply and exhaust of the motor fluid at the will of the operator to vary the length of driving stroke of the driving-heads, and a barrel-support between the heads on which the barrel is free to be moved longitudinally in either direction by the driving-heads during the hoop-driving operation, substantially as described.

In testimony whereof we have hereunto set our hands in the presence of two subscribing witnesses.

HENRY U. PALMER,
CHARLES LANGLOTZ.

Witnesses:
ELIJAH WINDSOR,
C. T. WHITE.